(12) United States Patent
Rieder et al.

(10) Patent No.: US 7,077,014 B2
(45) Date of Patent: Jul. 18, 2006

(54) VIBRATION-TYPE MEASURING TRANSDUCER

(75) Inventors: Alfred Rieder, Landshut (DE); Wolfgang Drahm, Freising (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/159,363

(22) Filed: Jun. 23, 2005

(65) Prior Publication Data

US 2006/0000293 A1    Jan. 5, 2006

Related U.S. Application Data

(60) Provisional application No. 60/581,767, filed on Jun. 23, 2004.

(30) Foreign Application Priority Data

Jun. 23, 2004 (DE) ................ 10 2004 030 392

(51) Int. Cl.
   *G01F 1/84* (2006.01)
(52) U.S. Cl. ............................. 73/861.357
(58) Field of Classification Search ........... 73/861.357, 73/861.355, 861.356
   See application file for complete search history.

(56) References Cited

U.S. PATENT DOCUMENTS

| 4,109,524 A | 8/1978 | Smith |
| 4,823,614 A | 4/1989 | Dahlin |
| 5,291,792 A | 3/1994 | Hussain |
| 5,398,554 A | 3/1995 | Ogawa |
| 5,476,013 A | 12/1995 | Hussain |
| 5,531,126 A | 7/1996 | Drahm |
| 5,705,754 A | 1/1998 | Keita |
| 5,796,012 A | 8/1998 | Gomi |
| 5,945,609 A | 8/1999 | Kashimura |
| 5,979,246 A | 11/1999 | Van Cleve |
| 6,006,609 A | 12/1999 | Drahm |
| 6,223,605 B1 | 5/2001 | Koudal |
| 6,484,591 B1 | 11/2002 | Drahm |
| 6,487,917 B1 * | 12/2002 | Van Cleve et al. ..... 73/861.357 |
| 6,840,109 B1 * | 1/2005 | Drahm et al. ................ 73/650 |
| 2002/0174730 A1 | 11/2002 | Drahm |

FOREIGN PATENT DOCUMENTS

| DE | 39 16 285 A1 | 11/1990 |
| DE | 100 20 606 A1 | 10/2001 |
| EP | 0 317 340 A2 | 5/1989 |
| EP | 0 518 124 A1 | 12/1992 |

(Continued)

*Primary Examiner*—Jewel V. Thompson
(74) *Attorney, Agent, or Firm*—Bacon & Thomas

(57) ABSTRACT

For conveying a fluid, the measuring transducer is equipped with a measuring tube, which is held oscillatably in a support element and vibrates during operation. The measuring tube executes, during operation, at least over part of its length, driven by an exciter arrangement, bending oscillations about an oscillation axis. These bending oscillations predominantly assume an oscillation form having at least three bending oscillation antinodes. Inlet-end and outlet-end oscillations are registered by means of a sensor arrangement. Additionally provided in the measuring transducer is a coupler arrangement connected with measuring tube and with support element and having at least one coupling element interacting mechanically, especially resiliently, with the vibrating measuring tube and the support element. By suitable choice of the effective spring constant, $c_{60}$, of the coupler arrangement, this can cancel transverse forces produced, during operation, on the part of the vibrating measuring tube, for example due to fluctuating fluid density.

36 Claims, 7 Drawing Sheets

FOREIGN PATENT DOCUMENTS

| | | |
|---|---|---|
| EP | 0 759 542 B1 | 2/1997 |
| EP | 1 055 101 B1 | 11/2000 |
| EP | 1 207 375 A1 | 5/2002 |
| EP | 1 110 059 B1 | 9/2004 |
| WO | WO 99/40394 | 8/1999 |
| WO | WO 99/41946 | 10/1999 |
| WO | WO 00/14485 | 3/2000 |
| WO | WO 01/27565 A1 | 4/2001 |

* cited by examiner

VIBRATION-TYPE MEASURING TRANSDUCER

FIELD OF THE INVENTION

The invention relates to a vibration-type, or vibratory, measuring transducer, especially one suited for use in a Coriolis mass flow meter.

BACKGROUND OF THE INVENTION

For determining a mass flow rate of a fluid, especially a liquid, flowing in a pipeline, it is common to use measuring devices, which bring-about Coriolis forces in the fluid by means of a measuring transducer of vibration-type and a control and evaluation electronics connected thereto and which produce, derived from these forces, a measurement signal representing the mass flow rate.

Such Coriolis mass flow meters have been known for a long time and are established in industrial applications. Thus, e.g. in DE-A 39 16 285, EP-A 317 340, EP-A 518 124, EP-A 1 207 375, U.S. Pat. Nos. 4,823,614, 5,291,792, 5,398,554, 5,476,013, 5,531,126, 5,691,485, 5,705,754, 5,796,012, 5,945,609, 5,979,246, 6,006,609, 6,223,605, 6,484,591, WO-A 99 51 946, WO-A 99 40 394 OR WO-A 00 14 485, Coriolis mass flow meters are described, each with a measuring transducer of vibration-type. The measuring transducer reacts to a mass flow rate of a fluid flowing in a pipeline and includes:
- a single, curved, or straight, measuring tube to convey the fluid and vibrate in operation, which measuring tube communicates with the pipeline via an inlet tube piece opening on the measuring tube inlet end and an outlet tube piece opening on the measuring tube outlet end,
- a support element fixed to the inlet and outlet ends of the measuring tube, as well as
- an exciter arrangement, which excites the measuring tube during operation mainly to bending oscillations in a tube plane, as well as
- a sensor arrangement for the point registering of inlet and outlet end oscillations of the measuring tube.

Vibrating measuring tubes of such measurement pickups are known to cause, when excited to lateral bending oscillations about an imaginary oscillation axis connecting the inlet and outlet ends, Coriolis forces in the through-flowing fluid. These, in turn, lead to a superimposing of coplanar bending oscillations of a second eigenoscillation form of higher and/or lower order, the so-called Coriolis mode, onto the excited bending oscillations in the so-called wanted mode, and, as a result, the oscillations registered by means of the sensor arrangement at the inlet and outlet ends exhibit a measurable phase difference dependent on, among other things, the mass flow rate.

Usually, the measuring tubes of such measuring transducers, e.g. as utilized in Coriolis mass flow meters, are excited, during operation, to an instantaneous resonance frequency of a natural eigenoscillation form, especially in the case of oscillation amplitude which is controlled to be constant. Since this resonance frequency is dependent especially also on the instantaneous density of the fluid, usual Coriolis mass flow meters on the market can also be used to measure, besides the mass flow rate, also the density of flowing fluids.

A significant disadvantage of the above-described measuring transducers lies in the fact that, due to alternating, lateral deflections of the single measuring tube vibrating predominantly in the wanted mode, oscillatory transverse forces of the same frequency can act on the pipeline and these transverse forces can only be compensated, independently of the density of the medium to be measured, by very great technical effort.

For improving the dynamic balance of the measuring transducer, especially for reducing such transverse forces produced by the vibrating, single, measuring tube and acting on the pipeline at the inlet and outlet ends of the measuring tube, the measuring transducers shown in EP-A 317 340, U.S. Pat. Nos. 5,398,554, 5,531,126, 5,691,485, 5,796,012, 5,979,246 or WO-A 00 14 485 each include at least one one-piece, or multi-part, counteroscillator, which, in each case, is fixed to the measuring tube at the inlet and outlet ends. Such beam-shaped, especially tubular, counteroscillators, or those counteroscillators realized as body pendula aligned with the measuring tube, oscillate, during operation, out of phase, especially with opposite phase, to that of the associated measuring tube, whereby the action of the transverse forces evoked, respectively, by measuring tube and counteroscillator on the pipeline can be minimized and possibly even completely suppressed.

Such measuring transducers with counteroscillator have proven themselves especially for applications where the fluid to be measured has an essentially constant, or only very slightly changing, density, thus for applications where a resulting force acting on the connected pipeline and derived from the transverse forces produced by the measuring tube and the opposing forces produced by the counteroscillator can initially be adjusted, without more, fixedly to zero.

In contrast, a measuring transducer of such type, especially according to U.S. Pat. No. 5,969,265, when applied for fluids with density fluctuating over a wide range, e.g. different fluids to be measured, sequentially following one another, has, while perhaps in lesser degree, practically the same disadvantage as a measuring transducer without counteroscillator, since the resultants of the transverse forces are also dependent on the density of the fluid and, therefore, can vary in significant measure from zero. Said differently, even a total system composed of measuring tube and counteroscillator is, during operation, globally deflected from an assigned, static, rest position on the basis of density dependent imbalances and transverse forces associated therewith.

Further possibilities also for the density independent reduction of such transverse forces are proposed e.g. in U.S. Pat. No. 5,531,126, WO-A 99 40 394 or WO-A 00 14 485.

In particular, a measuring transducer of vibration-type for a fluid flowing in a pipeline is described in WO-A 00 14 485 and includes:
- a measuring tube for conveying the fluid, inserted into the course of the pipeline and vibrating at least at times during operation;
- a first, especially likewise vibrating, support element affixed to an inlet end and to an outlet end of the measuring tube;
- an electromechanical exciter arrangement for producing an exciter force variable as a function of time, for causing the measuring tube to vibrate;
- a sensor arrangement for registering oscillations of the measuring tube; as well as
- a coupler arrangement connected with measuring tube and support element and having two coupling elements electromechanically interacting with the vibrating measuring tube and the support element for producing balancing oscillations;
- wherein the measuring tube, in operation, is excited by means of the exciter arrangement at least at times to an oscillation mode, in which it executes such bending oscillations about an oscillation axis imaginarily connecting the inlet end and the outlet end of the measuring tube, that it assumes mainly an oscillation form having a single bending-oscillation antinode, and in which it is laterally displaced at least at times out of an assigned, static, resting position due to concurrently produced transverse forces; and wherein the balancing oscillations of the coupling elements are so developed and arranged on the measuring tube, that the produced transverse forces are compensated and, consequently, a center of mass of an oscillation system formed of measuring tube, exciter arrangement, sensor arrangement and the two cantilevers is maintained in one position.

Furthermore, a measuring transducer of vibration-type for a fluid flowing in a pipeline is described in WO-A 99 40 394.

This transducer includes:

a measuring tube for conveying the fluid, inserted into the course of the pipeline and vibrating at least at times during operation, wherein the measuring tube communicates with the pipeline via a first connecting tube piece opening into the inlet end and via a second connecting tube piece opening into the outlet end and aligned with the first connecting tube piece and with the oscillation axis;

a support element fixed on an inlet end and on an outlet end of the measuring tube and adapted to serve as a likewise vibrating counteroscillator;

a second support element adapted to serve as a transducer housing;

an electromechanical exciter arrangement for producing an exciting force variable with time for causing the measuring tube to vibrate;

a sensor arrangement for registering oscillations of the measuring tube; as well as a coupler arrangement connected with the measuring tube, the two support elements, as well as the connecting tube pieces and having two coupling elements fixed to the vibrating measuring tube, the two support elements, and the connecting tube pieces, for transferring balancing forces into the transducer housing;

wherein the measuring tube is excited in operation by means of the exciter arrangement, at least at times, to an oscillation mode, in which it executes bending oscillations about an imaginary oscillation axis connecting the inlet end and the outlet end of the measuring tube, such that it assumes mainly a form of oscillation having a single bending oscillation antinode;

wherein the two coupling elements of the coupler arrangement are mechanically coupled with the measuring tube and the support element such that each of the two coupling elements act in a region of a common oscillation node of measuring tube and counteroscillator; and wherein a constant spring constant of the coupler arrangement determined by the coupling elements and acting between measuring tube and transducer housing is chosen sufficiently high that the coupler arrangement acts in an effective direction of the transverse forces essentially as a rigid body.

Moreover, a measuring transducer of vibration-type for a fluid flowing in a pipeline is shown in U.S. Pat. No. 5,531,126 to include:

a measuring tube for conveying the fluid, inserted into the course of the pipeline and vibrating at least at times during operation;

a first, especially likewise vibrating, support element affixed to an inlet end and to an outlet end of the measuring tube;

an electromechanical exciter arrangement for producing an exciter force, variable as a function of time, for causing the measuring tube to vibrate;

a sensor arrangement for registering oscillations of the measuring tube; as well as a coupler arrangement connected with measuring tube and support element and having a coupling element electromechanically interacting with the vibrating measuring tube and the support element;

wherein the measuring tube, in operation, is excited by means of the exciter arrangement at least at times to an oscillation mode, in which it executes such bending oscillations about an oscillation axis imaginarily connecting the inlet end and the outlet end of the measuring tube, that it assumes mainly an oscillation form having a single bending-oscillation antinode;

wherein the one coupling element is mechanically coupled with the measuring tube and the support element such that it acts on the measuring tube in a central region of the single oscillation antinode; and wherein an adjustable spring constant of the coupler arrangement determined by the coupling element and acting between measuring tube and support element is made to be negative.

In the case of the aforementioned measuring transducers, the problem of density-dependent imbalances is solved, in principle, by matching an amplitude response of the coupling elements or the counteroscillator, by means of variable spring constants dependent on the instantaneous oscillation amplitude, to the measuring tube oscillations during operation, in such a way that the transverse forces produced by the vibrating measuring tube and counteroscillator partially cancel one another. However, a disadvantage of the proposed measuring transducer is, in such cases, that despite technically always very complicated designs of the compensation mechanism, a complete neutralizing of the transverse forces produced by the measuring tube is neither practically nor theoretically possible.

Another possibility for reducing density-dependent, transverse forces is described in e.g. U.S. Pat. Nos. 5,287,754, 5,705,754 or U.S. Pat. No. 5,796,010. In the case of the measuring transducers shown in these patents, the transverse forces oscillating more at medium or high frequency, produced by the single, vibrating measuring tube, are kept away from the pipeline by means of a counteroscillator, which, compared to the measuring tube, is very heavy, and by means of, if necessary, a relatively soft coupling of the measuring tube to the pipeline, thus, in effect, by means of a mechanical, low-pass filter. A great disadvantage of such a measuring transducer lies, among other things, however, in the fact that the mass of the counteroscillator required for achieving a sufficiently robust damping increases more than proportionally with the nominal diameter of the measuring tube. An application of such massive structural components means, on the one hand, always an increased complexity of assembly, both in the manufacture and in the installing of the measuring device into the pipeline. On the other hand, in such case, it must always be assured that a minimum eigenfrequency of the measuring transducer, which becomes increasingly lower with increasing mass, lies, as before, far from the likewise very low eigenfrequencies of the connected pipeline. Consequently, a use of such a measuring transducer in industrially installable Coriolis mass flow meters, especially for measurements of liquids, or also in Coriolis mass flow/density meters, is most likely limited to relatively small nominal diameters of less than, or equal to, 10 mm.

Moreover, other disturbances of the described kind can, furthermore, arise, as, for example, also discussed in U.S. Pat. No. 5,291,792, in that, in addition to the oscillations in the wanted and Coriolis modes, also lateral, bending-oscillation modes can be excited, whose oscillation directions lie outside of, for example perpendicular to, the shared oscillation direction of the wanted and Coriolis modes.

SUMMARY OF THE INVENTION

An object of the invention is, therefore, to provide a measuring transducer, especially such as is suited for a Coriolis mass flow meter, or also for a Coriolis mass flow/density meter, that is dynamically well balanced over a broad range of fluid densities, even in the case of use of only a single measuring tube flowed through during operation, and which, especially also when using measuring tubes of nominal diameter greater than 10 mm, is nevertheless of relatively small mass. Additionally, an object of the invention is to achieve a selective detuning of such bending oscillation modes, whose oscillation direction runs perpendicular to the shared oscillation direction of the wanted and Coriolis modes, without that, as, for example shown in U.S. Pat. No. 6,840,109, additionally excited, wanted torsional oscillations about the above-mentioned oscillation axis imaginarily connecting in- and outlet ends of the measuring tube experience any appreciable influence therefrom.

A basic idea of the invention is, on the one hand, to allow the measuring tube to vibrate in a wanted mode, in which it assumes an oscillation form, which exhibits an uneven number of oscillation antinodes, thus, for example, three, five or seven oscillation antinodes, etc., and thus is developed essentially symmetrically. On the other hand, the invention aims to deform the oscillation form of the measuring tube, vibrating in the wanted mode, by means of spring forces introduced into the measuring tube, such that not only all spring forces acting in the direction of the exciter force, but also, as much as possible, all resulting acceleration forces in the measuring transducer acting in the same direction, especially the acceleration forces brought about by the vibrating measuring tube, even in the case of fluctuating fluid density, are each largely balanced, thus are each developed so as to compensate, or cancel, one another.

An advantage of the invention, in such case, is that the measuring transducer is, on the one hand, despite possible, operationally related fluctuations of the internal distribution of mass, e.g. due to fluctuating fluid density, quite well balanced, and, indeed, solely on the basis of its geometric forming of the bending oscillation form brought about by means of the coupler arrangement.

The measuring transducer of the invention distinguishes itself, furthermore, on the one hand, by having the ability to be very compact, and, on the other hand, by having the ability to be carried out very easily. Moreover, the measurement pickup, especially, however, also its coupler arrangement, can be manufactured with only very slight extra effort compared to conventional measurement pickups of the described kind.

The invention and further advantages will now be explained on the basis of an example of an embodiment illustrated in the figures of the drawing. Equal parts are provided in the figures with equal reference characters. In case useful for purposes of clarity, already mentioned reference characters are omitted in subsequent figures.

BRIEF DESCRIPTION OF THE DRAWINGS

FIG. 2a shows, in a perspective side view, an example of an embodiment for a measuring transducer of vibration-type suitable for the measuring device of FIG. 1, utilizing a straight measuring tube;

FIG. 2b shows an enlarged section of the measuring transducer of FIG. 2a;

DESCRIPTION OF THE PREFERRED EMBODIMENTS

Figure 1:
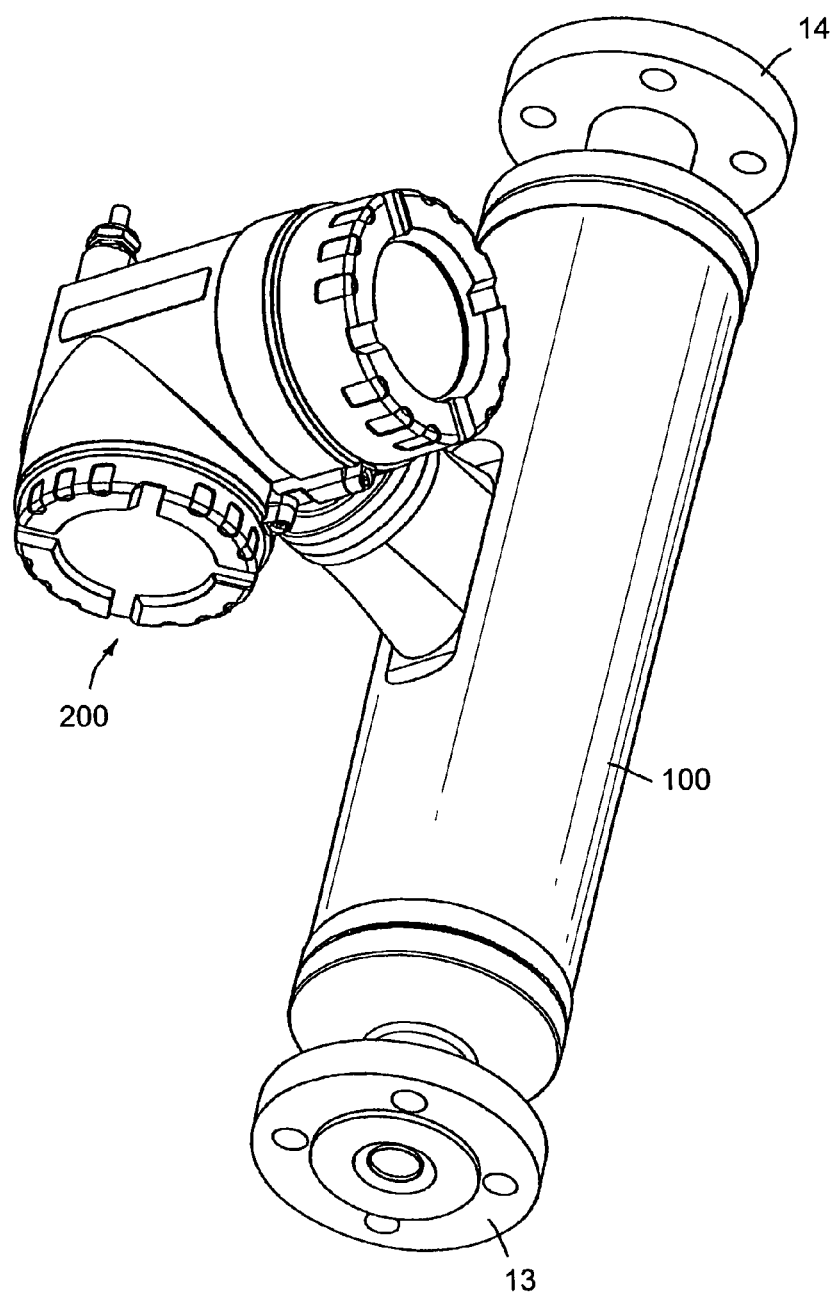
FIG. 1 shows a measuring device insertable into a pipeline for measuring at least one physical variable of a fluid conveyed in the pipeline.

The invention resides in a measuring transducer of vibration-type for a fluid flowing in a pipeline, which measuring transducer includes:
  a measuring tube for conveying the fluid, inserted into the course of the pipeline and vibrating at least at times during operation;
  a first support element affixed to an inlet end and to an outlet end of the measuring tube;
  an electromechanical exciter arrangement for producing an exciter force variable as a function of time, for causing the measuring tube to vibrate;
  a sensor arrangement for registering oscillations of the measuring tube; as well as
  a coupler arrangement connected with measuring tube and support element and having at least one coupling element interacting mechanically, especially resiliently, with the vibrating measuring tube and the support element;
  wherein the measuring tube, in operation, is excited by means of the exciter arrangement, at least at times, to an oscillation mode,
  in which it, at least in part, executes such bending oscillations about an oscillation axis imaginarily connecting the inlet end and the outlet end of the measuring tube, that it assumes mainly an oscillation form having at least three bending-oscillation antinodes;
  wherein the at least one coupling element of the coupler arrangement is mechanically coupled with the measuring tube and the support element such that it acts on the measuring tube in a region, especially a central region, of one of the three oscillation antinodes; and wherein a spring constant of the coupler arrangement, especially an essentially constant spring constant, determined by the at least one coupling element and effective between measuring tube and support element, lies above 0.5 times, especially in the range of 0.7 times to 1.3 times, a ratio which represents a transverse force introduced overall by the vibrating measuring tube at inlet and outlet ends into the support element and/or into the connected pipeline, referenced to a lateral deflection of a contact point in which the coupler arrangement acts on the measuring tube.

Moreover, the invention resides in a measuring transducer of vibration-type for a fluid flowing in a pipeline, which measuring transducer includes:

a measuring tube for conveying the fluid, inserted into the course of the pipeline and vibrating at least at times during operation;

a first support element affixed to an inlet end and to an outlet end of the measuring tube;

an electromechanical exciter arrangement for producing an exciter force variable as a function of time, for causing the measuring tube to vibrate;

a sensor arrangement for registering oscillations of the measuring tube; as well as a coupler arrangement connected with measuring tube and support element and having at least one coupling element interacting mechanically, especially resiliently, with the vibrating measuring tube and the support element;

wherein the measuring tube, in operation, is excited by means of the exciter arrangement, at least at times, to an oscillation mode, in which it, at least in part, executes bending oscillations about an oscillation axis imaginarily connecting the inlet end and the outlet end of the measuring tube, and, at least at times, to an oscillation mode, in which it, at least in part, executes torsional oscillations about essentially the same oscillation axis imaginarily connecting the inlet end and the outlet end of the measuring tube;

wherein the at least one coupling element of the coupler arrangement is mechanically coupled with the measuring tube and the support element such that it acts on the measuring tube in a central region; and wherein the coupling elements are embodied as leaf springs, which are connected with the measuring tube via a lever.

In a first embodiment of the invention, the at least one coupling element is subjected repeatedly to elastic deformations due to relative movements of the oscillating measuring tube and support element.

In a second embodiment of the invention, the at least one coupling element connects measuring tube and support element resiliently together.

In a third embodiment of the invention, the measuring tube, especially its oscillation form in the excited oscillation mode, is developed essentially symmetrically, especially rotationally symmetrically, with reference to an imaginary reference axis lying in the effective direction of the exciter force.

In a fourth embodiment of the invention, the measuring tube is essentially straight and the spring constant of the coupler arrangement is set at at least 10 times, especially about 20 times, the spring constant of the measuring tube.

In a fifth embodiment of the invention, the measuring tube is curved, especially bent in an essentially S-shape, and the spring constant of the coupler arrangement is adjusted to at least 0.8 times an effective spring constant of the measuring tube in the effective direction of the transverse force.

In a sixth embodiment of the invention, the first support element has, likewise in the effective direction of the transverse force, an effective spring constant, which differs from the spring constant of the measuring tube; especially, the spring constant of the measuring tube is chosen smaller than the spring constant of the first support element.

In a seventh embodiment of the invention, the first support element is constructed such that its mass is kept greater than a total mass of measuring tube with fluid contained therein.

In an eighth embodiment of the invention, the excited oscillation mode corresponds essentially to a natural eigenmode of the measuring tube with coupler arrangement acting thereon.

In a ninth embodiment of the invention, the vibrating measuring tube assumes an oscillation form with exactly three bending oscillation antinodes.

In a tenth embodiment of the invention, an oscillation frequency of the bending oscillations of the measuring tube in operation is always kept lower than a lowest mechanical resonance frequency of the support element.

In an eleventh embodiment of the invention, the first support element extends at least sectionally along the measuring tube.

In a twelfth embodiment of the invention, the measuring tube is at least partly enveloped by the first support element, especially a first support element of essentially tubular construction.

In a thirteenth embodiment of the invention, the measuring tube and the first support element are directed essentially coaxially with one another.

In a fourteenth embodiment of the invention, the measuring tube communicates with the pipeline via a first connecting tube piece opening into the inlet end and via a second connecting tube piece opening into the outlet end, especially a second connecting tube piece aligned with the first connecting tube piece and/or with the oscillation axis.

In a fifteenth embodiment of the invention, the first support element is embodied as a counteroscillator affixed to the measuring tube at the inlet and outlet ends and the measuring tube and the first support element are suspended via the first and second connecting tube pieces oscillatably in a second support element, especially a second support element embodied as a pickup housing.

FIG. 1 illustrates a measuring device insertable into a pipeline (not shown) for measuring at least one physical, measured variable—for example, a mass flow rate, m, a density, $\rho$, and/or a viscosity, $\eta$—of a fluid conveyed, especially flowing, in the pipeline. The measuring device includes for this purpose a vibration-type measuring transducer, which, in operation, is flowed-through by the fluid to be measured. The measuring transducer serves for producing in a through-flowing fluid mechanical reaction forces, e.g. mass flow rate dependent Coriolis forces, density-dependent inertial forces, and/or viscosity-dependent frictional forces, which react measurably, especially in manner registerable by sensor, on the measuring transducer. On the basis of these reaction forces, the mass flow rate, m, the density, $\rho$, and/or the viscosity, $\eta$, of the fluid can thus, for example, be measured, in manner known to those skilled in the art. FIGS. 2 to 6 schematically illustrate corresponding examples of embodiments and developments for such vibration-type measuring transducers.

Figure 2:
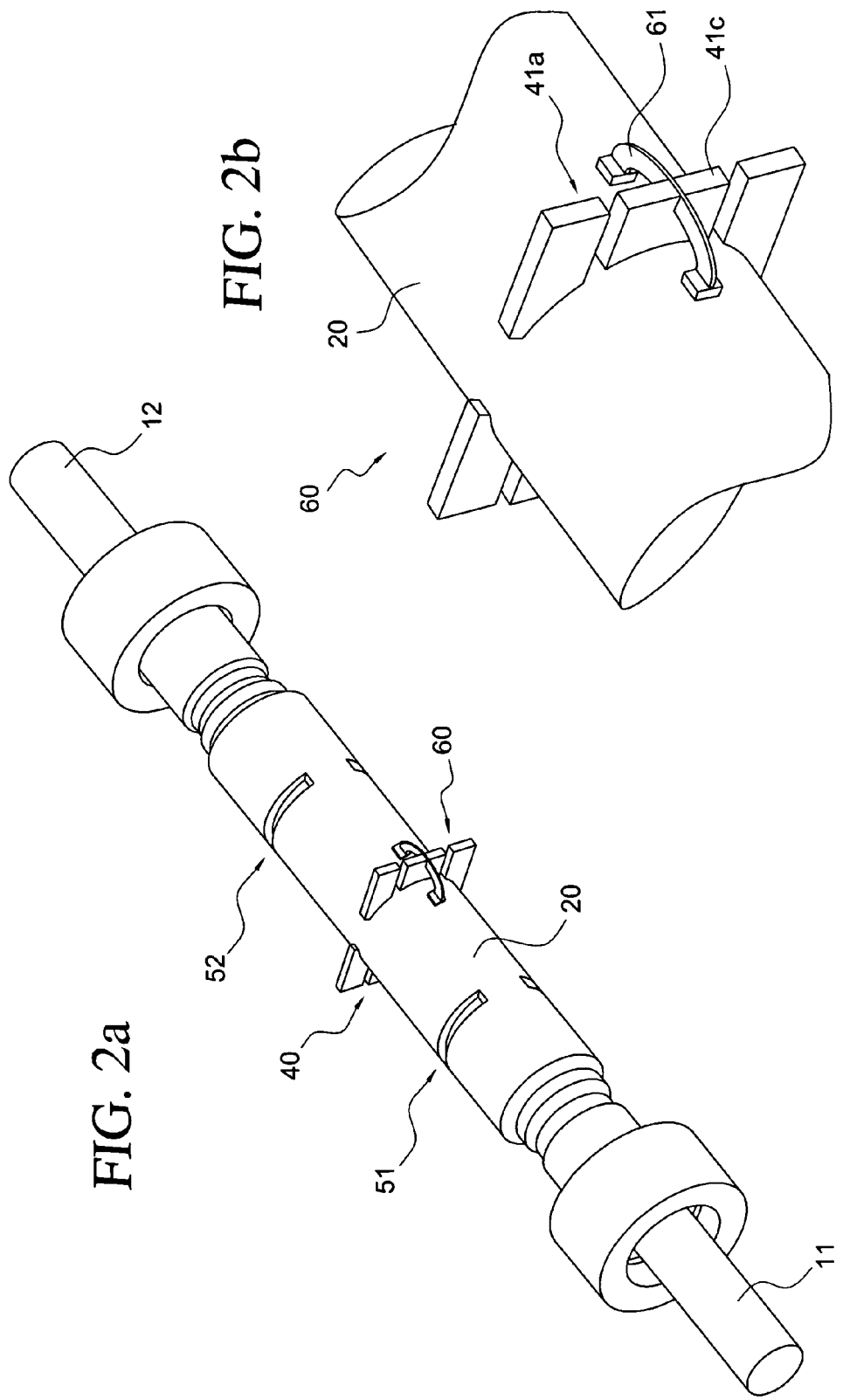
Figure 8:
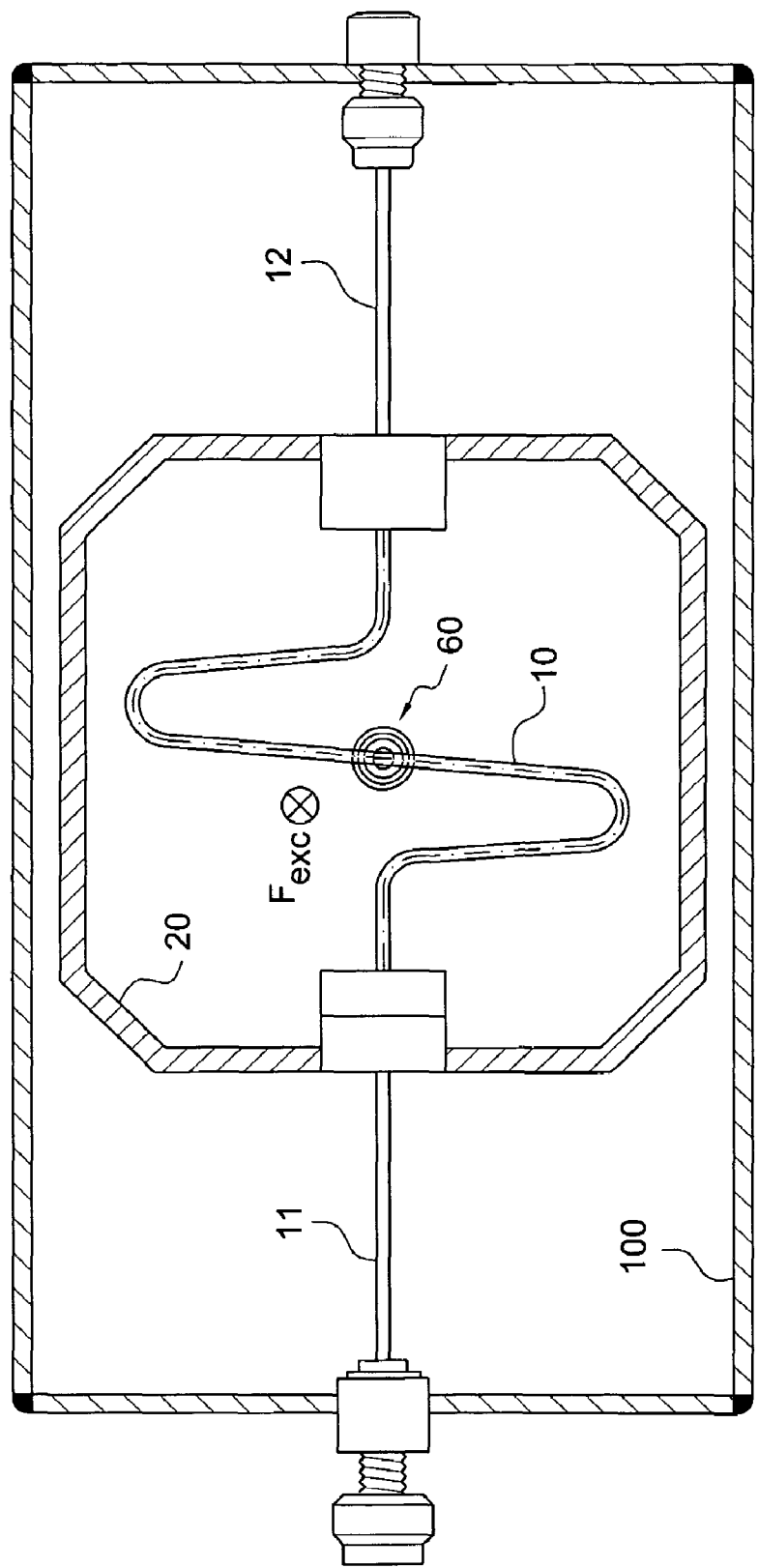
FIGS. 8–10 show, sectioned in side view, further examples of embodiments for a measuring transducer of vibration-type.
Figure 9:
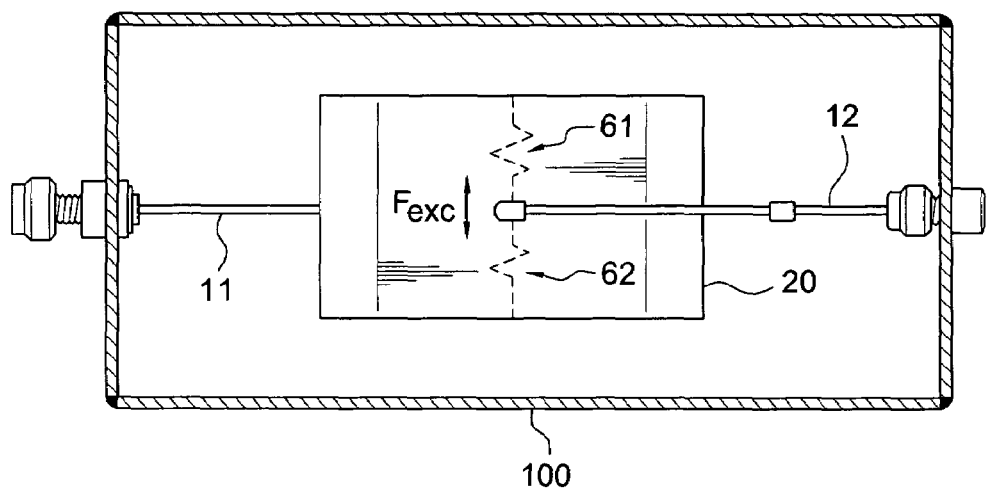
Figure 10:
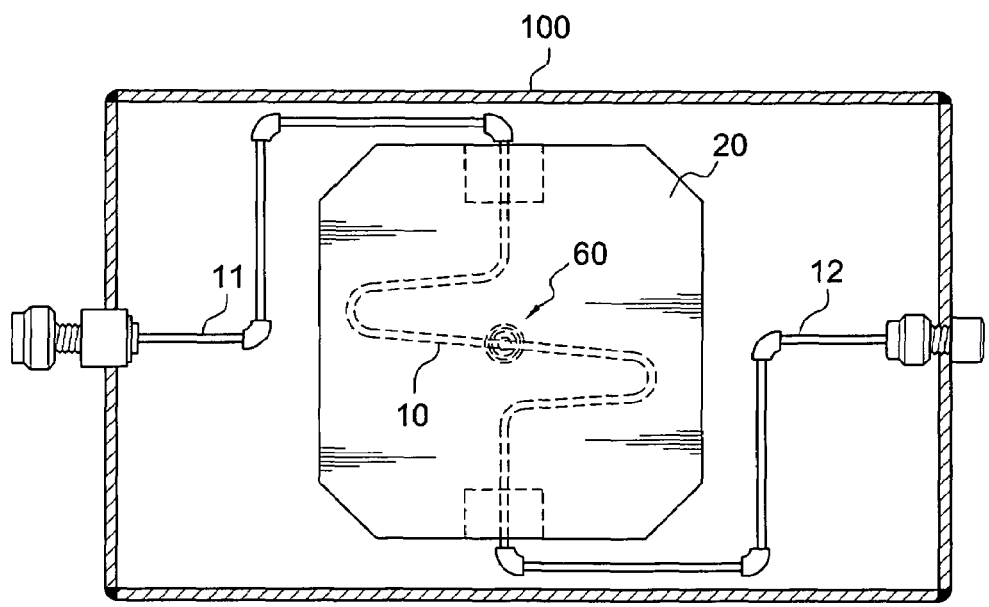

For the conveying of the fluid, the measuring transducer includes a single measuring tube 10 of predeterminable measuring tube diameter. During operation, the measuring tube 10 is caused, at least at times, to vibrate and is, consequently, repeatedly, especially cyclically, elastically deformed. As shown in FIG. 2, the essentially smooth-walled, cylindrical measuring tube 10 is, for such purpose, held oscillatably in a first support element 20 fixed thereto in suitable manner at the inlet and outlet ends. In the example of an embodiment shown here, the first support element 20 is tubular and directed especially coaxially to the measuring tube 10; the support element 20 can, in such case, be embodied, for example, as a transducer housing enveloping the measuring tube 10, besides further components of the measuring transducer. Instead of a support tube, e.g. an essentially box-shaped support frame can also serve as support element 20. In case required, the support element 20, which essentially extends along the measuring tube 10, can, however, also be embodied in the form of a solid support plate or, however, even a box-shaped support frame, as, in fact, shown e.g. in EP-A 518,124, U.S. Pat. No. 5,705,754 or U.S. Pat. No. 6,223,605. Other preferred embodiments of the support element 20, as well as other functions thereof, are explained in further detail below. Instead of the essentially straight measuring tube 10 shown in FIG. 2a or 3, however, also curved tubes can be used as measuring tube 10, especially tubes curved in a single plane, especially S-shaped tubes, such as are shown in FIGS. 8–10 or e.g. also in DE-A 39 16 285 or EP-A 518,124. An advantage of straight measuring tubes is e.g. that they can be emptied with high assurance of no residue, practically in any orientation of installation, especially also after a cleaning performed inline. Furthermore, such measuring tubes are, in comparison e.g. to an omega-shaped, or helically-shaped, curved measuring tube, significantly easier, and consequently more cost-favorable, to manufacture. On the other hand, such straight measuring tube measurement pickups usually exhibit, in comparison to curved measuring tube measurement pickups, an increased sensitivity to temperature fluctuations and the accompanying axial length-changes.

To achieve the flow-through of the fluid, the measuring tube 10 of FIGS. 2a, 3 or 8 to 10 is connected to a pipeline (not shown), respectively supplying the fluid to and conveying the fluid away, via a first connecting tube piece 11 opening on the inlet end and a second connecting tube piece 12 opening on the outlet end. Measuring tube 10, inlet tube piece 11 and outlet tube piece 12 are oriented in alignment with one another and with an imaginary longitudinal axis L and are advantageously embodied as one piece, so that e.g. a single, tubular stock can serve for their manufacture; in case required, measuring tube 10 and tube pieces 11, 12 can, however, also be manufactured by means of separate, subsequently joined, e.g. welded together, pieces of stock. For manufacturing the measuring tube 10, practically any materials usual for such measuring transducers can be used, such as e.g. steel, or alloys of titanium, zirconium or tantalum, etc. For the case that the measuring transducer is to be assembled releasably with the pipeline, a flange 13, respectively 14, is added to each of the two connecting tube pieces 11, 12; in case required, the connecting tube pieces 11, 12 can also be connected directly with the pipeline, e.g. by means of welding or brazing.

Figure 3:
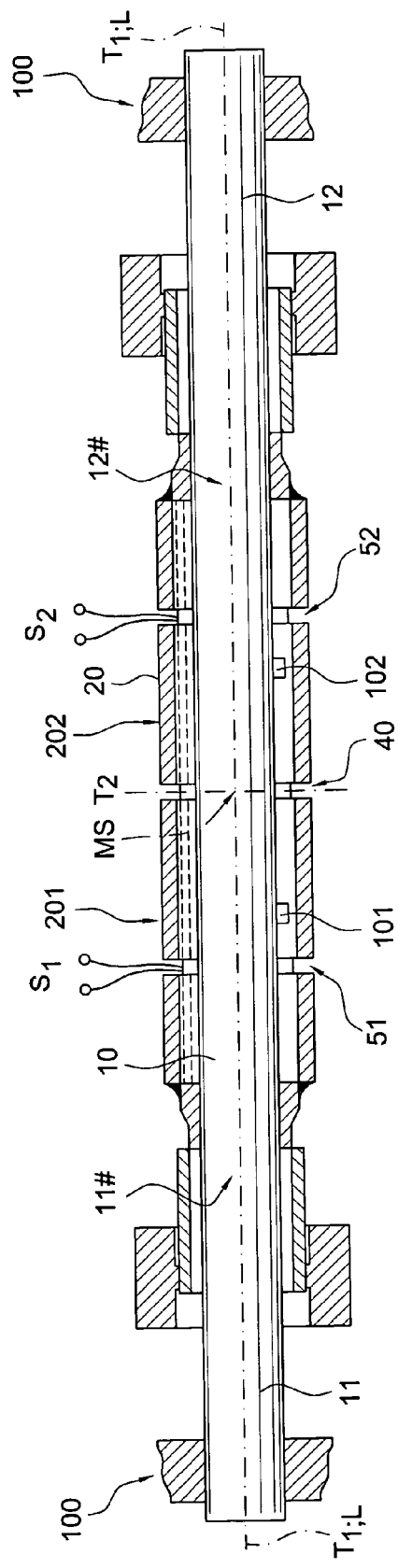
FIG. 3 shows the measuring transducer of FIG. 2a sectioned in a side view.

In addition to the first support element 20, a second support element 100 can be fixed to the connecting tube pieces 11, 12, as evident from the combination of FIGS. 1, 2a and 3, or also FIGS. 8 to 10. The second support element 100 can then, for example, be adapted to be the transducer housing accommodating the measuring tube 10, instead of the first support element 20.

In operation of the measuring transducer, the measuring tube 10 is, at least at times, excited to bending oscillations, especially in the region of an instantaneous, natural eigenfrequency, such that, in this excited oscillation mode, the so-called wanted mode, it executes, at least partially, bending oscillations about an oscillation axis imaginarily connecting an inlet end and an outlet end of the measuring tube 10. According to the invention, the measuring tube 10 is excited in such case to an oscillation mode in which it assumes mainly a first form of oscillation exhibiting three bending-oscillation antinodes. Said differently, this natural form of eigenoscillation with three bending-oscillation antinodes has the largest share in the instantaneous characteristics of the excited, wanted mode, or its oscillation form. The first oscillation form of the measuring tube 10 vibrating in the excited oscillation mode in such a way, thus mainly exhibiting three or more oscillation antinodes, is, in such case, essentially symmetric, especially rotation symmetric, with reference to an imaginary reference axis lying in the effective direction of the exciter force $F_{exc}$. In an advantageous embodiment of the invention, the vibrating measuring tube 10 is, however, purposely excited such that it assumes predominantly an oscillation form with exactly three bending oscillation antinodes, thus predominantly oscillating in the so-called f3 mode.

For the case wherein the fluid is flowing in the pipeline and, consequently, the mass flow rate m is different from zero, then the measuring tube 10, vibrating in the above-described manner, induces Coriolis forces in the fluid flowing through it. These, in turn, react on the measuring tube 10 and, therefore, evoke an additional, sensor-registerable deformation (not shown) of the measuring tube 10 in a second oscillation form, which is coplanarly and equifrequently superimposed on the excited, wanted mode of the, in this case, straight measuring tube 10. The instantaneous influence on the deformation of the measuring tube 10, especially respecting the amplitudes of the deformation, is, in such case, dependent on the instantaneous mass flow rate m. An oscillation form e.g. with four oscillation antinodes or even symmetrical oscillation forms with six or more oscillation antinodes can serve as the second oscillation form, the so-called Coriolis mode.

For producing mechanical oscillations of the measuring tube 10, the measuring transducer further includes an exciter arrangement 40, especially an electrodynamic exciter arrangement. This serves to convert electrical energy $E_{exc}$, e.g. having a controlled current and/or controlled voltage, into an exciter force $F_{exc}$ acting, e.g. with pulse-shape or harmonically, on the measuring tube 10 and elastically deforming such in the above-described manner. The exciter force $F_{exc}$ can, in such case, as shown schematically in FIG. 3 or FIG. 9, be bidirectional, or even unidirectional, and can be adjusted, in the manner known to those skilled in the art, e.g. by means of a current and/or voltage control circuit, with respect to its amplitude and with respect to its frequency, e.g. by means of a phase-locked loop. Serving as the exciter arrangement 40 is e.g. a plunger-coil arrangement, which includes at least one cylindrical exciter coil secured on the measuring tube 10 or on the first support element 20 and flowed-through during operation by a corresponding exciter current, and a permanently magnetic armature at least partially plunging into the exciter coil and fixed, respectively, on the support element 20 or on the measuring tube 10. Additionally, the exciter arrangement 40 can also be realized by means of one or more electromagnets, as shown e.g. in U.S. Pat. No. 4,524,610. Moreover, it is also possible to realize the exciter arrangement 40 by means of seismic exciters, as shown e.g. in WO-A 99 51 946.

For detecting oscillations of the measuring tube 10, the measuring transducer includes, additionally, a sensor arrangement 50, especially an electrodynamic one. Used as sensor arrangement 50 can be e.g. a sensor arrangement usual for such measuring transducers. These sensor arrangements utilize, in manner known to those skilled in the art, at least one, first sensor 51, and preferably also a second sensor 52, to register the movements of the measuring tube 10, especially at its inlet and outlet ends, and to provide therefrom corresponding sensor signals $S_1$, $S_2$. Used as sensors 51, 52 can be e.g., as also illustrated schematically in FIG. 5, electrodynamic velocity sensors, or electrodynamic distance sensors or acceleration sensors, relatively measuring the oscillations of measuring tube 10 and counteroscillator 20. Instead of electrodynamic sensor arrangements, also stain measuring strips, e.g. strain gages, which measure resistively or piezoelectrically, or optoelectronic sensor arrangements can serve for detecting the oscillations of the measuring tube 10. The sensor signals can be converted into the corresponding measured values by means of appropriate, especially digital, evaluation electronics, in manner known to those skilled in the art. Both the above-mentioned control electronics for the exciter arrangement 40 and also the evaluation electronics connected with the sensor arrangement 50 can be accommodated in an electronics housing 200 preferably secured on the transducer housing 100.

In a further embodiment of the invention, the exciter arrangement 40 is, as also shown in FIGS. 3 and 4, so embodied and arranged in the measuring transducer that it acts during operation simultaneously, especially differentially, on the measuring tube 10 and on the counteroscillator 20. In corresponding manner, the sensor arrangement 50 can be so designed and arranged in the measuring transducer that it differentially registers the vibrations of measuring tube 10 and counteroscillator 20.

In the example of an embodiment shown in FIG. 2, measuring tube 10, support element 20, together with the sensor and exciter arrangements 40, 50 secured thereon, are—as e.g. also proposed in the initially mentioned WO-A 03/0959950—so matched to one another with respect to their mass distribution, that the thus formed, internal part of the measuring transducer, suspended in the second support element 100 by means of the inlet and outlet tube pieces 11, 12, exhibits a center of mass MS, which lies at least inside of the measuring tube 10, preferably, however, as near as possible to the longitudinal axis L of the measuring tube.

Furthermore, the internal part, at least when using a straight measuring tube, is advantageously so constructed that it exhibits a first principal axis of inertia $T_1$ aligned with the two connecting tube pieces 11, 12 and at least sectionally lying within the measuring tube 10; oscillation axis, measuring tube L and principal axis are, moreover, practically coincident in the example of an embodiment shown in FIG. 3.

Due to the shift of the center of mass MS of the internal part, especially, however also due to the above-described position of the first principal axis of inertia $T_1$, the oscillation forms assumed by the measuring tube 10 during operation, namely the above-mentioned bending oscillations in the wanted and Coriolis modes, are mechanically decoupled, as much as possible, from possible torsional oscillations of measuring tube 10. In this way, wanted bending oscillations and wanted torsional oscillations can, on the one hand, be excited separately from one another; on the other hand, disturbing torsional oscillations can equally effectively be separated from the bending oscillations in the wanted mode and/or the Coriolis mode. Both the shift of the center of mass MS and also of the first principal axis of inertia $T_1$ towards the longitudinal axis L of the measuring tube can, for example, be significantly simplified by having the internal part, thus measuring tube 10, support element 20, as well as the sensor and exciter arrangements secured thereto, so constructed and arranged with respect to one another that a mass distribution of the internal part along the longitudinal axis L of the measuring tube is essentially symmetric, at least, however, invariant with respect to an imaginary rotation, about the longitudinal axis L of the measuring tube by 180° (c2-symmetry)

Figure 5:
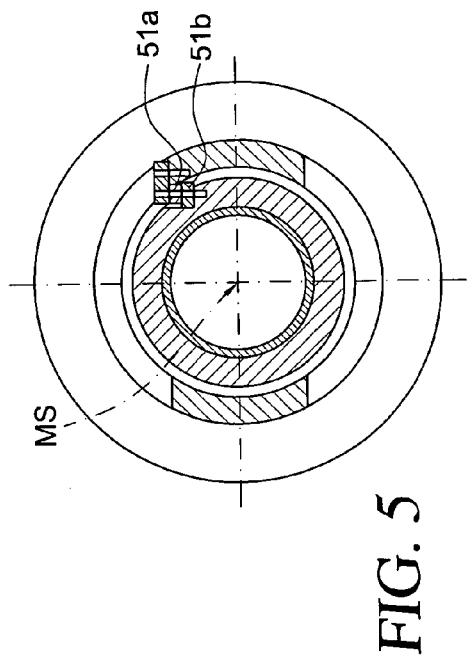
FIG. 5 shows the measuring transducer of FIG. 2a in a third cross section.

In a further embodiment of the invention, the, in such case, tubular support element 20, arranged essentially coaxially with the measuring tube 10, is also constructed so as to be largely axially symmetric with reference to the principal axis of inertia $T_1$, whereby the achievement of a symmetric mass distribution of the internal part is considerably simplified and, therefore, also the center of mass MS is shifted in simple manner near to the longitudinal axis L of the measuring tube; compare FIG. 3 or FIG. 5. Moreover, the sensor and exciter arrangements 50, 40 are also advantageously so constructed and arranged on the measuring tube 10 and, as required, on the counteroscillator 20, that a mass moment of inertia produced by them is formed as concentrically as possible with the longitudinal axis L of the measuring tube or at least kept as small as possible. This can be achieved e.g. by keeping the center of mass for the combined sensor and exciter arrangements 50, 40 likewise as near as possible to the longitudinal axis L of the measuring tube and/or by maintaining a total mass of sensor and exciter arrangements 50, 40 as small as possible.

In a further embodiment of the invention, the exciter arrangement 40 is, for the purpose of separate excitation of torsional and/or bending oscillations of the measuring tube, or, however, also for the active damping of disturbing torsional oscillations, so constructed and so fixed on the measuring tube 10 and on the counteroscillator 20, that a force producing the bending oscillations acts along an imaginary line of force extending outside of a second principal axis of inertia $T_2$ perpendicular to the first principal axis of inertia $T_1$ or intersects the second principal axis of inertia $T_2$ in, at most, one point. Preferably the internal part is so embodied that the second principal axis of inertia $T_2$ corresponds essentially to the above-mentioned imaginary reference axis lying in the direction in which the exciter force, $F_{exc}$, is acting; compare FIG. 3 or FIG. 4.

Figure 4B:
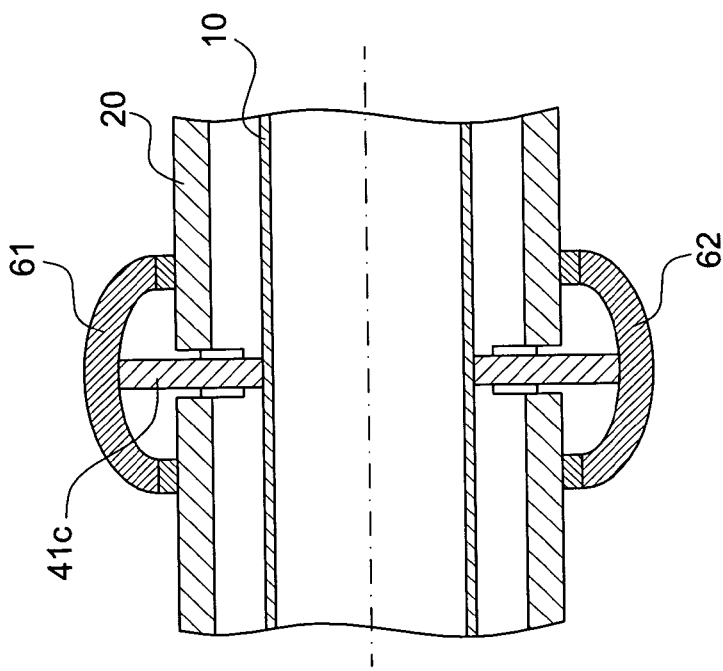
FIG. 4b shows the measuring transducer of FIG. 2a in a second cross section.
Figure 4A:
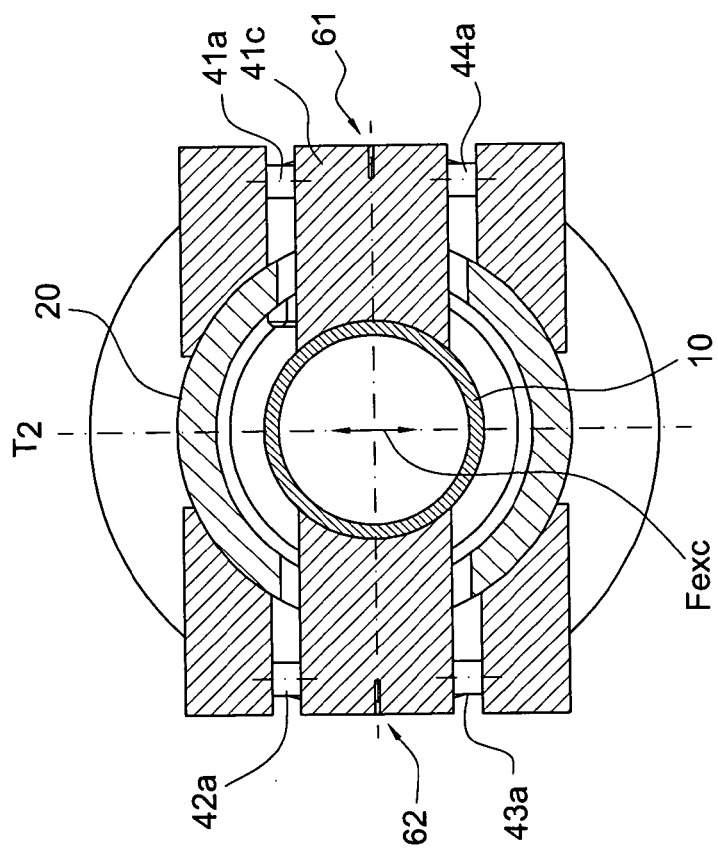
FIG. 4a shows the measuring transducer of FIG. 2a in a first cross section.

In the example of an embodiment illustrated in FIG. 4a, the exciter arrangement 40 exhibits for this purpose at least one, first exciter coil 41a flowed through at least at times by the exciter current or an exciter current component. Coil 41a is fixed on a rigid lever 41c connected with the measuring tube 10 and, by way of this lever 41c and an armature 41b fixed externally to the counteroscillator 20, acts differentially on the measuring tube 10 and the counteroscillator 20. This arrangement has, among other things, also the advantage that, on the one hand, the counteroscillator 20 and, therefore, also the transducer housing 100, is kept small, and, in spite of that, the exciter coil 41a, especially also during assembly, is easily accessible. Moreover, there is a further advantage of this embodiment of the exciter arrangement 40 that possibly used, especially in the case of nominal diameters in excess of 80 mm no longer of negligible weight, coil cups 41d are attached to the counteroscillator 20 and, consequently, have practically no influence on the resonance frequencies of the measuring tube 10. It is, however, to be noted here, that, in case necessary, the exciter coil 41a can also be mounted on the counteroscillator 20, in which case the armature 41b is then mounted on the measuring tube 10.

In a further embodiment of the invention, the exciter arrangement 40 has at least one, second exciter coil 42a arranged along a diameter of the measuring tube 10. This second exciter coil 42a is coupled with the measuring tube 10 and the counteroscillator 20 in the same manner as the exciter coil 41a. In a further development of the invention, the exciter arrangement has two more exciter coils 43a, 44a, thus a total of four exciter coils, arranged symmetrically at least with reference to the second principal axis of inertia $T_2$, which are all mounted in the aforementioned manner in the measuring transducer.

The force acting on the measuring tube 10 outside of the second principal axis $T_2$ of inertia can be produced by means of such two, or four, coil arrangements in simple manner e.g. by providing one of the exciter coils, e.g. the exciter coil 41a, with another inductance than inductances of other coils or by providing that one of the exciter coils, e.g. the exciter coil 41a, is flowed-through in operation by an exciter current component different from a pertinent exciter current component of each other exciter coil.

In a further embodiment of the invention, the sensor arrangement 50 includes, as schematically shown in FIG. 5, a sensor coil 51a fixed on the measuring tube 10 and arranged outside of the second principal axis of inertia $T_2$. The sensor coil 51a is arranged as close as possible to an armature 51b fixed to the counteroscillator 20 and magnetically coupled therewith, such that a changeable measurement voltage is induced in the sensor coil, on the basis of rotational and/or lateral, relative movements between measuring tube 10 and counteroscillator 20 changing their relative orientations and/or their relative separation. Due to the arrangement of the sensor coil 51a in accordance with the invention, both the above-mentioned torsional oscillations and also the possibly excited bending oscillations can advantageously be registered simultaneously. If necessary, the sensor coil 51a therefor can, instead, be fixed to the counteroscillator 20, and, in corresponding manner, the armature coupled therewith is then fixed on the measuring tube 10.

It is to be noted here that, if necessary, the exciter arrangement 40 and the sensor arrangement 50 can have practically the same mechanical structure; moreover, the aforementioned embodiments of the mechanical structure of the exciter arrangement 40 can essentially be transferred onto the mechanical structure of the sensor arrangement 50, and vice versa.

In the case of an exciting of the bending oscillations in the wanted mode, it is known that transverse forces are produced over the length of the single measuring tube 10 vibrating in the above-described manner. These forces are a result of the accelerations of mass associated with the bending oscillations. In the case of an internal part constructed in conventional manner with a simple measuring tube 10 oscillating in a natural, symmetrical eigenmode and a first support element acting as counteroscillator, a resultant of the aforementioned transverse forces in the case of significantly fluctuating density, $\rho$, is no longer negligibly small. For example, in the case of a conventional measuring transducer of the described kind having a titanium tube serving as measuring tube 10, with a nominal diameter of 18 mm, a wall thickness of about 1 mm and a length of about 660 mm and filled with water as the medium, for the f3-mode (dashed line) schematically illustrated in FIG. 6 in about an oscillation frequency of 950 to 1000 Hz and in the case of an oscillation amplitude of about 10 microm, a resultant transverse force, $Q_{10}$, totalling about 30 N would result, as can be seen from FIG. 7 (dashed line).

For the case that this resultant force, $Q_{10}$, caused by the vibrating tube 10 is not compensated, then a transverse impulse remains in the internal part, thus in the measuring transducer, which, in turn, leads to a shifting of the measuring tube 10, together with the first support element 20 fixed thereto, laterally out of its intended, static rest position. Correspondingly thereto, the transverse force, $Q_{10}$, would act at least partially also on the connected pipeline, in this embodiment by way of the connecting tube pieces 11, 12, and this would, consequently, likewise vibrate. Moreover, practically unavoidable mechanical asymmetries in the measuring transducer and/or in the connected pipeline would lead, as a matter of course, to the exciting of parasitic, asymmetric oscillation modes, which are superimposed equifrequently on the oscillations of the Coriolis mode in a manner no longer separable without special measures. As a result of this, one can particularly experience, for instance, considerable zero point errors in the generation of the measured value.

For minimizing such oscillating transverse forces generated by the vibrating measuring tube, especially such forces also acting on the pipeline and being, therefore, damaging for the measurement, the measuring transducer additionally includes a coupler arrangement 60 connected with measuring tube 10 and support element 20. This coupler arrangement 60 includes at least one, first coupling element 61 interacting mechanically, especially resiliently, with the vibrating measuring tube and with the support element 20. The at least one coupling element 61 of the coupler arrangement 60 is, in such case, coupled mechanically with the measuring tube 10 and with the support element 20 such that it acts on the measuring tube 10 in a region, especially a central region, of one of the at least three oscillation antinodes. As a result of this, also a spring constant, $c_{60}$, of the coupler arrangement 60, determined by the at least one coupling element 61, becomes active between measuring tube 10 and support element 20.

Figure 6:
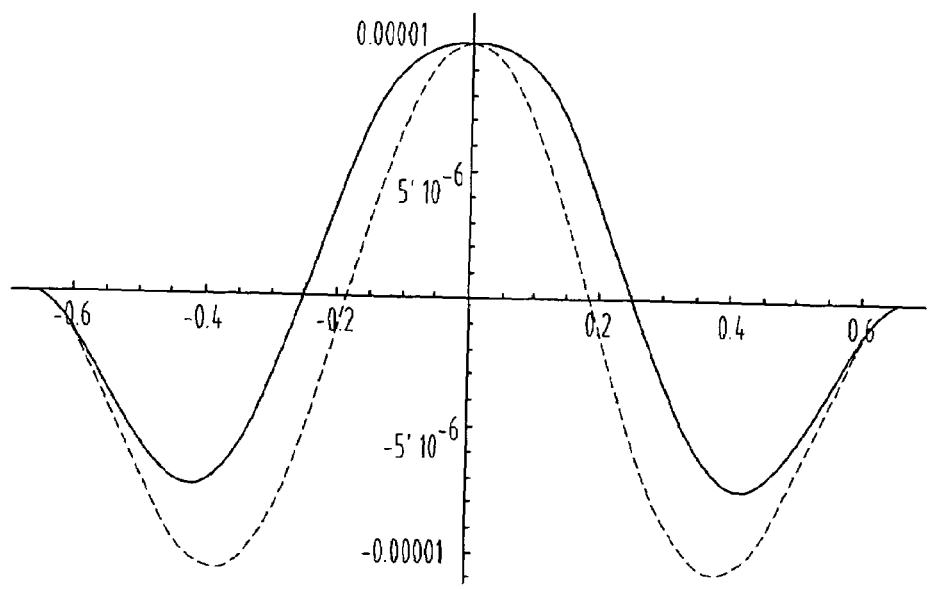
FIG. 6 shows bending oscillation forms for vibrating measuring tubes.
Figure 7:
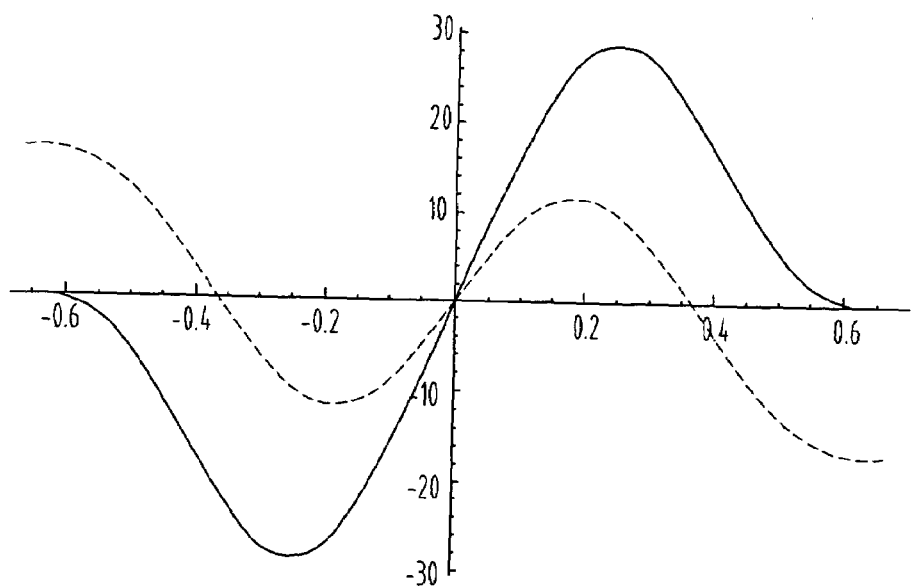
FIG. 7 shows the behavior of transverse forces produced by measuring tubes in the measurement pickup vibrating in the oscillation forms of FIG. 6.

The effect of the coupler arrangement 60 of the invention, now, lies in the fact that the above-mentioned, first oscillation form of the measuring tube 10 with coupler arrangement interacting therewith, as represented schematically in FIG. 6 by the continuous line), in the excited wanted mode, is deformed, in comparison with an oscillation form of a measuring tube (FIG. 6, dashed line) held only on its ends but otherwise essentially freely oscillating in a natural oscillation mode having the same number of oscillation antinodes, surprisingly such that the lateral acceleration forces (FIG. 7, continuous line) caused by the moved masses of the oscillating measuring tube 10 essentially mutually cancel. Similarly, surprisingly, however, those bending forces, which are likewise caused by the measuring tube 10, as it oscillates in the wanted mode, in the joint connection locations of measuring tube 10 and support system 20—here the joint connection locations of measuring tube 10, support system 20 and connecting tube pieces 11, 12—are also largely canceled due to the fact that appropriate resilient forces are induced in the at least one coupling element 61 and introduced into the joint connection locations of measuring tube 10 and support system 20, via the support element 20 connected therewith, in opposition to the mentioned bending forces.

In a further embodiment of the invention, the measuring tube 10 is excited by means of the exciter arrangement 40 such that the wanted mode with the above-mentioned bending oscillation form corresponds essentially to a natural eigenmode of the measuring transducer that is essentially determined by the measuring tube 10 and the coupler arrangement 60 acting thereon. Stated differently, the measuring tube 10 is to oscillate in the wanted mode with a natural eigenfrequency that essentially is determined both by the oscillation characteristics of the measuring tube 10 with the fluid flowing therethrough and by the oscillation characteristics of the coupler arrangement 60 acting on the measuring tube 10.

The coupling element 61 of the invention can involve, for example, essentially resiliently acting, coupling elements of positive spring constant, thus simple spiral or leaf springs or the like, which are fixed both to the measuring tube 10 and to the support element 20 in suitable manner. However, also those coupling elements can be used, which have an electrically adjustable, negative spring constant, thus one or more magnet coils flowed through, at least in part, by an appropriate direct current; compare, in this connection, also the initially mentioned U.S. Pat. No. 5,531,126. For example, the above-mentioned exciter arrangement with the exciter coils can, consequently, serve simultaneously as a coupler arrangement.

In an embodiment of the invention, the at least one coupling element 61 is embodied as a mechanical spring and, as shown in FIGS. 4a and 4b, fixed on the one hand likewise to the lever 41c connected to the measuring tube 10. On the other hand, the coupling element is also fixed directly to the counteroscillator. Because of the coupling element, measuring tube 10 and support element 20 are not only connected together on the ends radially rigidly, but also, additionally, in a, here, central section oscillating during operation with opposite phase, where they are connected together radially essentially resiliently. In keeping with this, the coupling element 61 undergoes unavoidably repeated elastic deformations, due to relative movements of the oscillating measuring tube 10 and the support element 20 during operation. In the illustrated example of an embodiment, the coupling element is embodied as a simple leaf spring, if necessary slightly bent in a plane. This spring is attached in a central section to the lever 41c, for example, as schematically shown in FIGS. 2a, b or 4, by soldering into a slot formed in the end of the lever 41c.

According to an advantageous, further development of the invention, the coupler arrangement further includes, additionally to the first coupling element 61, a second coupling element 62 having essentially a structure which is essentially the same as that of the first coupling element 61. The second coupling element 62 acts likewise on the measuring tube, in the region of one of the bending oscillation antinodes thereof. Advantageously, the two coupling elements are, in such case, so arranged in the measuring transducer, that the coupler arrangement 60 is essentially symmetrically constructed, at least with reference to the above-mentioned imaginary reference axis lying in the effective direction of the exciter force, $F_{exc}$.

Investigations have shown further that the above-described, transverse forces can be largely compensated alone by means of the coupler arrangement, when the spring constant, $c_{60}$, of the coupler arrangement 60, as determined by the at least one coupling element and acting between measuring tube 10 and support element 20, lies above 0.5-times a ratio, $Q_{10}/x_0$, which represents the transverse force, $Q_{10}$, introduced, over all, by the vibrating measuring tube 10 at the inlet and outlet ends into the support element 20 and/or into the pipeline, referenced to a lateral excursion, $x_0$, of a contact point at which the coupler arrangement 60, in the final analysis, acts on the measuring tube 10. Very good results respecting the canceling of the transverse forces, $Q_{10}$, can, in such case, be achieved especially when the spring constant, $c_{60}$, of the coupler arrangement 60 lies about in the range of 0.7 to 1.3 times the aforementioned ratio, $Q_{10}/x_0$.

Further, it was determined that, alternatively or supplementally to the aforementioned dimensioning rule, the spring constant, $c_{60}$, of the coupler arrangement 60 can be likewise very easily determined or at least approximately very well estimated based on the following mathematical relationship for a coupler arrangement contacting centrally a measuring tube 10 oscillating in the f3 mode:

$$c_{60} = \alpha \cdot \frac{E \cdot J}{l^3}, \qquad (1)$$

where

α is a constant corresponding with, especially proportional to, an eigenvalue of the bending oscillation form of the excited, wanted mode, E is the elastic modulus (E or Young's modulus) of the material used for the measuring tube, J is the areal moment of inertia of the particular measuring tube, and l is the total, or stretched, length of the measuring tube or of the bending line.

For essentially straight measuring tubes, the constant α amounts to about 4000, while it is estimated at about 600 for measuring tubes bent with essentially S-shape.

For the case, that the measuring tube 10 is, as shown in FIG. 3, essentially of straight shape, the use of the aforementioned dimensioning rules leads, in each case, to the result that the spring constant, $c_{60}$, of the coupler arrangement 60 is adjusted to at least 10 times, or, in the case of use of conventional materials and dimensions, especially to about 20 times, the spring constant, $c_{10}$, of the measuring tube. For the case, that the measuring tube is essentially in the form of a curve in a plane, especially an S-shaped curve, application of the dimensioning rule leads, in turn, to the fact that the spring constant, $c_{60}$, of the coupler arrangement is to be adjusted to at least 0.8 times a spring constant, $c_{10}$, of the measuring tube 10 effective in the effective direction of the transverse force, $Q_0$.

Further improvements regarding the compensation, canceling, of the transverse forces can additionally be achieved by giving the first support element 20, likewise in the effective direction of the transverse force, $Q_0$, an effective spring constant, $c_{20}$, which differs from the spring constant, $c_{10}$, of the measuring tube 10. To this end, the spring constant, $c_{10}$, of the measuring tube is, in a further, advantageous embodiment of the invention, especially at least 5 times lower than the spring constant, $c_{20}$, of the first support element 20. Alternatively or even supplementally, an embodiment of the invention provides that an oscillation frequency of the bending oscillations of the measuring tube 10 is selected such that it is always kept lower during operation than a lowest mechanical resonance frequency of the support element 20.

In a further embodiment of the invention, the bending-resistant support element 20 is made very heavy in comparison to the measuring tube 10. To this end, in this embodiment of the invention, a mass of the first support element 20 is selected such that a total mass of the measuring tube 10 with fluid contained therein is less than this support element mass.

An additional advantage of the invention, however, is that the good results regarding the neutralizing of the transverse forces induced by the vibrating measuring tube can surprisingly also be achieved when the bending-resistant, first support element 20 holding the measuring tube and, thus, the entire measurement pickup, are of very light design. Accordingly, the mass of the first support element 20 can also be selected such that the entire mass of the measuring tube 10 with fluid contained therein is greater than this support element mass. A bending resistant and yet light support element can, in the example of an embodiment shown in FIG. 3, be achieved in simple manner e.g. by placing rod- or beam-shaped reinforcements laterally on the tubular support element 20. The reinforcements essentially extend parallel to the longitudinal axis L of the measuring tube. Another possibility for creating a comparatively light, yet still very bending resistant support element 20 lies in the use of appropriate materials of high E-modulus and low density, such as e.g. glass, ceramic, glass-ceramic, synthetic material, such as plastics, reinforced with glass and/or carbon fibers, or the like.

Beyond this, it has been found, surprisingly, that not only can a very effective detuning of such lateral bending oscillation modes be achieved by means of the coupler arrangement 60 shown in the example of an embodiment using leaf springs—here with sickle-shape—in each case essentially eccentrically contacting the measuring tube 10 via the lever 41c, but, also, that, especially in contrast to the measuring transducer shown in U.S. Pat. No. 5,291,792, despite this, by all means, desired detuning of such disturbing bending oscillation modes, the oscillation characteristics of possibly additionally excited (simultaneously or alternatingly), wanted, torsional oscillations about the oscillation axis imaginarily connecting the above-mentioned in- and outlet ends of the measuring tube, such as can be excited, for example, also in the case of the measuring transducer of U.S. Pat. No. 6,840,109, are scarcely affected.

For those skilled in the art, there is, moreover, no difficulty in realizing that the coupler arrangement 60 of the invention is preferably to be constructed such that a resulting effective line of all resilient forces produced by it in total coincides with the above mentioned imaginary reference axis lying in the effective direction of the exciter force, $F_{exc}$. Moreover, the coupler arrangement 60 is to be embodied for practical applications also such that a distribution of all resilient forces produced by it in total is formed essentially symmetrically with reference to the aforementioned reference axis.

The invention claimed is:

1. A measuring transducer of a vibration-type for a fluid flowing in a pipeline, which measuring transducer comprises:
    a measuring tube for conveying the fluid, inserted into the course of the pipeline and vibrating, at least at times, during operation;
    a first support element affixed to an inlet end and to an outlet end of said measuring tube;
    an electromechanical exciter arrangement for producing an exciter force, variable as a function of time, for causing said measuring tube to vibrate;
    a sensor arrangement for registering oscillations of said measuring tube; and
    a coupler arrangement connected with said measuring tube and support element and having at least one coupling element interacting mechanically, especially resiliently, with said vibrating measuring tube and said support element, wherein:
    said measuring tube, in operation, is excited by means of said exciter arrangement, at least at times, to an oscillation mode, in which it, at least in part, executes such bending oscillations about an oscillation axis imaginarily connecting the inlet end and the outlet end of said measuring tube, that it assumes predominantly an oscillation form having at least three bending-oscillation antinodes;
    said at least one coupling element of said coupler arrangement is mechanically coupled with said measuring tube and said support element such that it acts on said measuring tube in a region, especially a central region, of one of the three oscillation antinodes; and
    a spring constant, of said coupler arrangement, especially an essentially constant spring constant, determined by said at least one coupling element and effective between said measuring tube and said support element, lies above 0.5 times, especially in the range of 0.7 times to 1.3 times, a ratio, $Q_{10}/x_0$, which represents a transverse force, $Q_{10}$, introduced overall by said vibrating measuring tube at inlet and outlet ends into said support element and/or into the connected pipeline, referenced to a lateral excursion, of a contact point in which said coupler arrangement acts on said measuring tube.

2. The measuring transducer as claimed in claim 1, wherein:
    said at least one coupling element is subjected repeatedly to elastic deformations due to relative movements of said oscillating measuring tube and said support element.

3. The measuring transducer as claimed in claim 1, wherein:
    said at least one coupling element connects said measuring tube and said support element resiliently together.

4. The measuring transducer as claimed in claim 1, wherein:
    said measuring tube, especially its oscillation form in the excited oscillation mode, is developed essentially symmetrically, especially rotationally symmetrically, with reference to an imaginary reference axis lying in the effective direction of the exciter force.

5. The measuring transducer as claimed in claim 1, wherein:
    said measuring tube is essentially straight.

6. The measuring transducer as claimed in the claim 1, wherein:
    the spring constant of said coupler arrangement is set at at least 10 times, especially about 20 times, the spring constant, of said measuring tube.

7. The measuring transducer as claimed in claim 1, wherein:
    said measuring tube is curved, especially bent in an essentially S-shape.

8. The measuring transducer as claimed in claim 1, wherein:
    the spring constant of the coupler arrangement is set at at least 0.8 times an effective spring constant of said measuring tube in the effective direction of the transverse force.

9. The measuring transducer as claimed in claim 1, wherein:

said first support element has, likewise in the effective direction of the transverse force, an effective spring constant, which is different from the spring constant, of said measuring tube.

10. The measuring transducer as claimed in claim 1, wherein:
the spring constant, of said measuring tube is chosen smaller than the spring constant, of said first support element.

11. The measuring transducer as claimed in claim 1, wherein:
a total mass of said measuring tube with fluid contained therein is chosen smaller than a mass of said first support element.

12. The measuring transducer as claimed in claim 1, wherein:
the excited oscillation mode corresponds essentially to a natural eigenmode of said measuring tube with said coupler arrangement acting thereon.

13. The measuring transducer as claimed in claim 1, wherein:
said vibrating measuring tube assumes predominantly an oscillation form with exactly three bending oscillation antinodes.

14. The measuring transducer as claimed in claim 1, wherein:
an oscillation frequency of the bending oscillations of said measuring tube during operation is always kept lower than a lowest mechanical resonance frequency of said support element.

15. The measuring transducer as claimed in claim 1, wherein:
said first support element extends at least sectionally along said measuring tube.

16. The measuring transducer as claimed in claim 1, wherein:
said measuring tube is at least partly enveloped by said first support element, especially said first support element of essentially tubular construction.

17. The measuring transducer as claimed in claim 1, wherein:
said measuring tube and said first support element are oriented essentially coaxially with one another.

18. The measuring transducer as claimed in claim 1, wherein:
said measuring tube communicates with the pipeline via a first connecting tube piece opening into the inlet end and via a second connecting tube piece opening into the outlet end, especially a second connecting tube piece aligned with the first connecting tube piece and/or with the oscillation axis.

19. The measuring transducer as claimed in claim 18, wherein:
said first support element is embodied as an counteroscillator affixed to said measuring tube at the inlet and outlet ends; and
said measuring tube and said first support element are suspended via said first and second connecting tube pieces oscillatably in a second support element, especially said second support element embodied as a pickup housing.

20. A measuring transducer of vibration-type for a fluid flowing in a pipeline, which measuring transducer comprises:
a measuring tube for conveying the fluid, inserted into the course of the pipeline and vibrating at least at times during operation;
a first support element affixed to an inlet end and to an outlet end of said measuring tube;
an electromechanical exciter arrangement for producing an exciter force, variable as a function of time, for causing said measuring tube to vibrate;
a sensor arrangement for registering oscillations of said measuring tube; and
a coupler arrangement connected with said measuring tube and said support element and having coupling elements interacting mechanically, especially resiliently, with said vibrating measuring tube and said support element, wherein:
said measuring tube, in operation, is excited by means of said exciter arrangement, at least at times, to an oscillation mode, in which it, at least in part, executes bending oscillations about an oscillation axis imaginarily connecting the inlet end and the outlet end of said measuring tube, and, at least at times, to an oscillation mode, in which it, at least in part, executes torsional oscillations about essentially the same oscillation axis imaginarily connecting the inlet end and the outlet end of said measuring tube;
said at least one coupling element of said coupler arrangement is mechanically coupled with said measuring tube and said support element such that it acts on said measuring tube in a central region; and
said coupling elements are embodied as leaf springs, which are connected with said measuring tube via a lever.

21. The measuring transducer as claimed in claim 20, wherein:
said at least one coupling element is subjected repeatedly to elastic deformations due to relative movements of said oscillating measuring tube and said support element.

22. The measuring transducer as claimed in claim 20, wherein:
said at least one coupling element connects said measuring tube and said support element resiliently together.

23. The measuring transducer as claimed in claim 20, wherein:
said measuring tube, especially its oscillation form in the excited oscillation mode, is developed essentially symmetrically, especially rotationally symmetrically, with reference to an imaginary reference axis lying in the effective direction of the exciter force.

24. The measuring transducer as claimed in claim 20, wherein:
said measuring tube is essentially straight.

25. The measuring transducer as claimed in claim 20, wherein:
the spring constant of the coupler arrangement is set at at least 0.8 times an effective spring constant of said measuring tube in the effective direction of the transverse force.

26. The measuring transducer as claimed in claim 20, wherein:
said first support element has, likewise in the effective direction of the transverse force, an effective spring constant, which is different from the spring constant, of said measuring tube.

27. The measuring transducer as claimed in claim 20, wherein:
the spring constant, of said measuring tube is chosen smaller than the spring constant, of said first support element.

28. The measuring transducer as claimed in claim 20, wherein:

a total mass of said measuring tube with fluid contained therein is chosen smaller than a mass of said first support element.

29. The measuring transducer as claimed in claim 20, wherein:

the excited oscillation mode corresponds essentially to a natural eigenmode of said measuring tube with said coupler arrangement acting thereon.

30. The measuring transducer as claimed in claim 20, wherein:

said vibrating measuring tube assumes predominantly an oscillation form with exactly three bending oscillation antinodes.

31. The measuring transducer as claimed in claim 20, wherein:

an oscillation frequency of the bending oscillations of said measuring tube during operation is always kept lower than a lowest mechanical resonance frequency of said support element.

32. The measuring transducer as claimed in claim 20, wherein:

said first support element extends at least sectionally along said measuring tube.

33. The measuring transducer as claimed in claim 20, wherein:

said measuring tube is at least partly enveloped by said first support element, especially said first support element of essentially tubular construction.

34. The measuring transducer as claimed in claim 20, wherein:

said measuring tube and said first support element are oriented essentially coaxially with one another.

35. The measuring transducer as claimed in claim 20, wherein:

said measuring tube communicates with the pipeline via a first connecting tube piece opening into the inlet end and via a second connecting tube piece opening into the outlet end, especially a second connecting tube piece aligned with the first connecting tube piece and/or with the oscillation axis.

36. The measuring transducer as claimed in claim 35, wherein:

said first support element is embodied as an counteroscillator affixed to said measuring tube at the inlet and outlet ends; and said measuring tube and said first support element are suspended via said first and second connecting tube pieces oscillatably in a second support element, especially said second support element embodied as a pickup housing.

* * * * *